United States Patent
Cullen et al.

(10) Patent No.: US 9,995,289 B2
(45) Date of Patent: Jun. 12, 2018

(54) BUNDLE HOLDER FOR USE IN AN ENERGY RECOVERY DEVICE

(71) Applicant: EXERGYN LIMITED, Dublin (IE)

(72) Inventors: Barry Cullen, Dublin (IE); Kevin O'Toole, Dublin (IE); Geogiana Tirca-Dragomirescu, Dublin (IE); Keith Warren, Dublin (IE); Rory Beirne, Dublin (IE)

(73) Assignee: EXERGYN LIMITED, Dublin (IE)

( * ) Notice: Subject to any disclaimer, the term of this patent is extended or adjusted under 35 U.S.C. 154(b) by 0 days. days.

(21) Appl. No.: 15/315,083

(22) PCT Filed: May 29, 2015

(86) PCT No.: PCT/EP2015/062047
§ 371 (c)(1),
(2) Date: Nov. 30, 2016

(87) PCT Pub. No.: WO2015/181388
PCT Pub. Date: Dec. 3, 2015

(65) Prior Publication Data
US 2017/0198682 A1    Jul. 13, 2017

(30) Foreign Application Priority Data

May 30, 2014 (GB) .................................. 1409679.6

(51) Int. Cl.
F03G 7/06 (2006.01)
(52) U.S. Cl.
CPC .................................. F03G 7/065 (2013.01)

(58) Field of Classification Search
CPC .................................. F03G 7/065; F03G 7/06
See application file for complete search history.

(56) References Cited

U.S. PATENT DOCUMENTS

| 4,010,612 A | 3/1977 | Sandoval |
| 4,027,479 A | 6/1977 | Cory |
| 2006/0101807 A1* | 5/2006 | Wood ........................ B64C 7/02 60/262 |
| 2011/0120113 A1 | 5/2011 | Alexander |

FOREIGN PATENT DOCUMENTS

| GB | 2 497 542 | 6/2013 |
| JP | S60 22079 | 2/1985 |
| JP | 2014037806 A | * 2/2014 |

OTHER PUBLICATIONS

Machine translation of JP2014037806A, accessed on Aug. 24, 2017.*

* cited by examiner

Primary Examiner — Jonathan Matthias
(74) Attorney, Agent, or Firm — Occhiuti & Rohlicek LLP

(57) ABSTRACT

The invention provides an energy recovery device comprising an engine comprising a plurality of Shape Memory Alloy (SMA) or Negative Thermal Expansion (NTE) elements fixed at a first end and connected at a second end to a drive mechanism wherein a holder is configured with a plurality of slots adapted to receive the plurality of Shape Memory Alloy (SMA) or NTE elements.

9 Claims, 8 Drawing Sheets

BUNDLE HOLDER FOR USE IN AN ENERGY RECOVERY DEVICE

CROSS-REFERENCE TO RELATED APPLICATIONS

This application is the National Stage of International Application No. PCT/EP2015/062047, filed on May 29, 2015, which claims the priority of GB Application No. 1409679.6, filed on May 30, 2014. The contents of these applications are hereby incorporated by reference in their entirety.

FIELD

The present application relates to the field of energy recovery and in particular to the use of Shape-Memory Alloys (SMAs) or Negative Thermal Expansion materials (NTE) for the same.

BACKGROUND

Low grade heat, which is typically considered less than 100 degrees, represents a significant waste energy stream in industrial processes, power generation and transport applications. Recovery and re-use of such waste streams is desirable. An example of a technology which has been proposed for this purpose is a Thermoelectric Generator (TEG). Unfortunately, TEGs are relatively expensive. Another largely experimental approach that has been proposed to recover such energy employs Shape-Memory Alloys.

A Shape-Memory Alloy (SMA) is an alloy that "remembers" its original, cold-forged shape which, once deformed, returns to its pre-deformed shape upon heating. This material is a lightweight, solid-state alternative to conventional actuators such as hydraulic, pneumatic, and motor-based systems.

The three main types of Shape-Memory Alloys are the copper-zinc-aluminium-nickel, copper-aluminium-nickel, and nickel-titanium (NiTi) alloys but SMAs can also be created, for example, by alloying zinc, copper, gold and iron. The list is non-exhaustive.

The memory of such materials has been employed or proposed since the early 1970s for use in heat recovery processes and in particular by constructing SMA engines which recover energy from heat as motion. Recent publications relating to energy recovery devices include PCT Patent Publication number WO2013/087490, assigned to the assignee of the present invention. Other patent publications include US2005/150223 (United Technologies) and U.S. 2013/341845 (Zanella). It is desirable to translate the contraction of the SMA or NTE material into a mechanical force in an efficient manner. It is not a trivial task and generally is complicated and involves significant energy losses.

It is therefore an object to provide an improved system and method in an energy recovery device.

SUMMARY

According to the present invention there is provided, as set out in the appended claims, an energy recovery device comprising:

an engine comprising a plurality of Negative Thermal Expansion (NTE) elements such as, but not limited to, Shape-Memory Alloys (SMAs), fixed at a first end and connected at a second end to a drive mechanism characterised by a holder configured with a plurality of slots adapted to receive the plurality of Shape Memory Alloy (SMA) or NTE elements.

The motivation behind the creation of the invention was to be able to shape the ends of the Shape Memory Alloy (SMA) or NTE elements in such a way that they may be kept in some sort of a support frame or holder such that the high force developed by their contraction can be safely transmitted in a manner resulting in mechanical work.

In one embodiment the holder comprises a plate perforated with suitably sized slots such that the elements can engage the slots and be secured in place.

In one embodiment at least one element comprises a swage terminal end for restricting movement of the element when engaged with the holder.

In one embodiment at least one element comprises a kinked or bent end for restricting movement of the element when engaged with the holder.

In one embodiment at least one element comprises a dome shaped end for restricting movement of the element when engaged with the holder.

In one embodiment the Negative Thermal Expansion (NTE) element comprises a Shape Memory Alloy. In one embodiment the Shape Memory Alloy comprises a Nickel-Titanium alloy.

In one embodiment the Shape Memory Alloy (SMAs) or Negative Thermal Expansion (NTE) elements are arranged as a plurality of wires positioned substantially parallel with each other to define a core.

In another embodiment there is provided an energy recovery device comprising a plurality of Shape Memory Alloy (SMAs) or Negative Thermal Expansion (NTE) elements arranged as a plurality of wires positioned substantially parallel with each other to define a core.

In another embodiment there is provided a holder, for use in an energy recovery device or engine, comprising a plurality of slots configured to receive a plurality of Negative Thermal Expansion (NTE) elements.

In one embodiment the holder comprises a plate perforated with suitably sized slots such that the elements can engage the slot and be secured in place.

In another embodiment there is provided an engine comprising a plurality of Shape Memory Alloy (SMA) or Negative Thermal Expansion (NTE) elements fixed at a first end and connected at a second end to a drive mechanism wherein a holder is configured with a plurality of slots adapted to receive the plurality of Shape Memory Alloy (SMA) or NTE elements.

BRIEF DESCRIPTION OF THE DRAWINGS

The invention will be more clearly understood from the following description of an embodiment thereof, given by way of example only, with reference to the accompanying drawings, in which.

DETAILED DESCRIPTION OF THE DRAWINGS

The invention relates to a heat recovery system which can use either Shape Memory Alloys (SMAs) or other Negative Thermal Expansion materials (NTE) to generate power from low grade heat.

Figure 1:
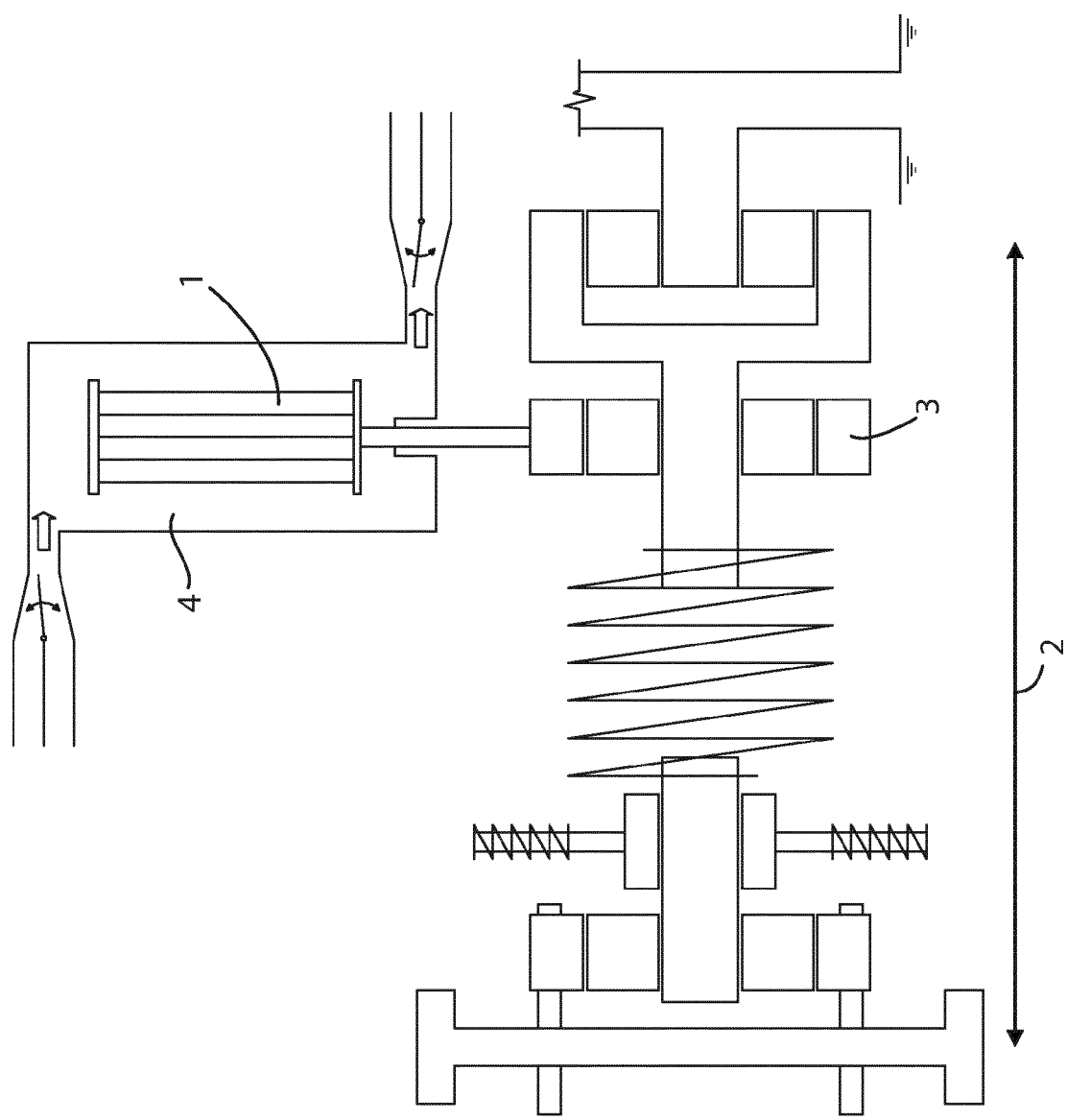
FIG. 1 illustrates an energy recovery system.

An exemplary embodiment of an energy recovery device will now be described with reference to FIG. 1 which illustrates an energy recovery device employing a SMA engine indicated by reference numeral 1. The SMA engine 1 comprises a SMA actuation core. The SMA actuation core is comprised of SMA material clamped or otherwise secured at a first point which is fixed. At the opposing end, the SMA material is clamped or otherwise secured to a drive mechanism 2. Thus whilst the first point is anchored the second point is free to move albeit pulling the drive mechanism 3. An immersion chamber 4 is adapted to house the SMA engine and is also adapted to be sequentially filled with fluid to allow heating and/or cooling of the SMA engine. Accordingly, as heat is applied to the SMA core it is free to contract. Suitably, the SMA core comprises a plurality of parallel wires, ribbons or sheets of SMA material. Typically, a deflection in and around 4% is common for such a core. Accordingly, when a 1 m length of SMA material is employed, one might expect a linear movement of approximately 4 cm to be available. It will be appreciated that the force that is provided depends on the mass of wire used. Such an energy recovery device is described in PCT Patent Publication number WO2013/087490, assigned to the assignee of the present invention, and is incorporated fully herein by reference.

For such an application, the contraction of such material on exposure to a heat source is captured and converted to usable mechanical work. A useful material for the working element of such an engine has been proven to be Nickel-Titanium alloy (NiTi). This alloy is a well-known Shape-Memory Alloy and has numerous uses across different industries. It will be appreciated that any suitable SMA or NTE material can be used in the context of the present invention.

Force is generated through the contraction and expansion of this alloy (presented as a plurality of wires) within the working core, via a piston and transmission mechanism. An important aspect of the system is the ability to secure the NiTi elements at both ends such that a reliable assembly is created, enabling high-force, low displacement work to be performed for a maximum number of working cycles. Accordingly, depending on the requirements of a particular configuration and the mass of SMA material needed a plurality of SMA wires may be employed together, spaced substantially parralell to each other, to form a single core.

The wire's extremities have to be presented in such a way that they can be securely fixed in a metallic, or other material, support, hereinafter referred to as a bundle holder. The invention provides a holder, for use in an energy recovery device, comprising a plurality of slots configured to receive a plurality of Negative Thermal Expansion (NTE) or Shape Memory Alloy (SMA) elements.

Figure 2:
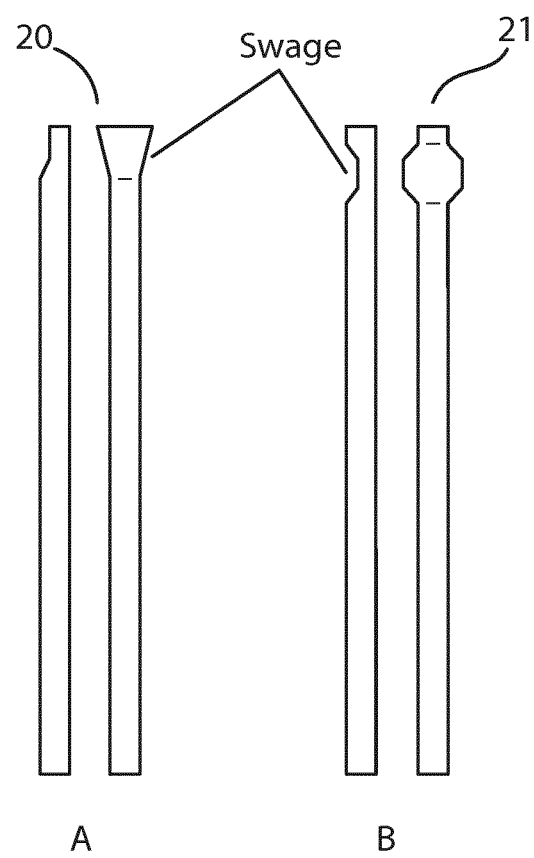
FIG. 2 illustrates views of a number of wires making up the engine core, according to one aspect of the invention.

According to one embodiment of the invention there is provided a solution to the problem of securely fixing the wires in a bundle holder by swaging the wire at the ends and therefore making part of the wire wider thereby allowing it to be held in position by a bundle or wire holder. FIG. 2 illustrates two wires that can be used to form a core indicated by the reference numerals 20 and 21. The swage can be made in two ways, Swage A, 20, and Swage B, 21. Swage A is located at the very end of the wire whereas Swage B is located just before the end of the wire, as illustrated in FIG. 2. The type of swage used can be determined by the bundle holder or the space which the wire needs to fit into.

Figure 3:
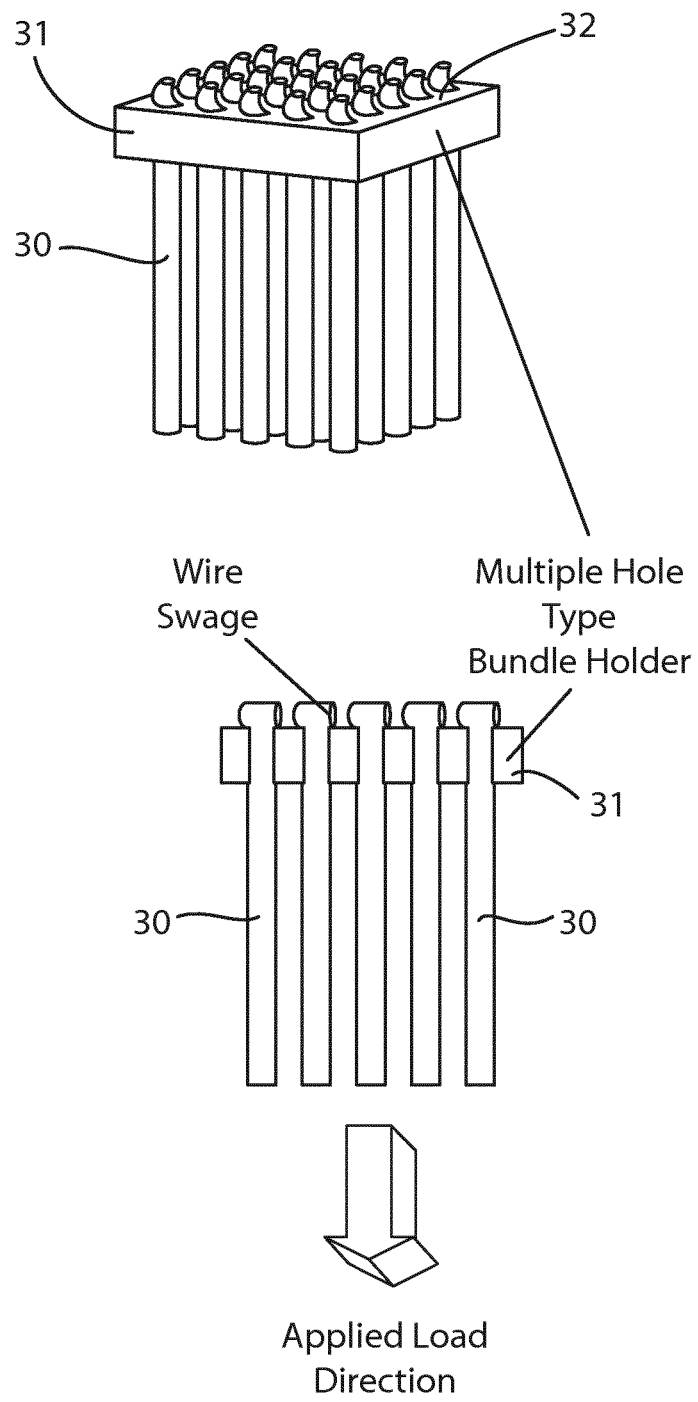
FIG. 3 illustrates a plurality of swaged wires fed into a bundle holder, according to one embodiment of the invention.

FIG. 3 illustrates a plurality of swaged wires 30 fed into a bundle holder 31 consisting of multiple slots 32 or holes or openings. The slots, openings or holes are designed to be smaller in diameter than the swage width, but marginally larger in diameter than the wire 30. When a load is applied, the wire 30 is prevented from decoupling from the bundle holder 31 by the swage which will not pass through the bundle holder opening or hole. In effect, the swage sits on the shoulder of the bundle holder 31.

Figure 4:
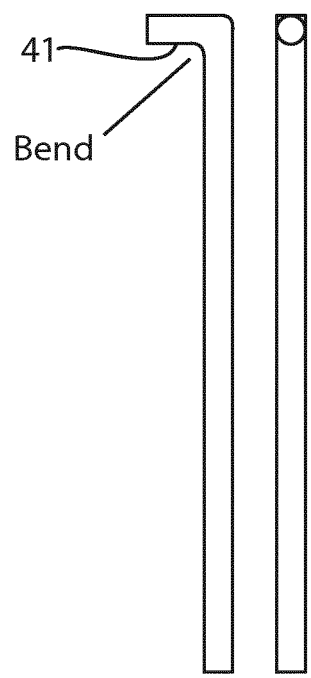
FIG. 4 illustrates views of a number of wires making up the engine core, according to one aspect of the invention.
Figure 5:
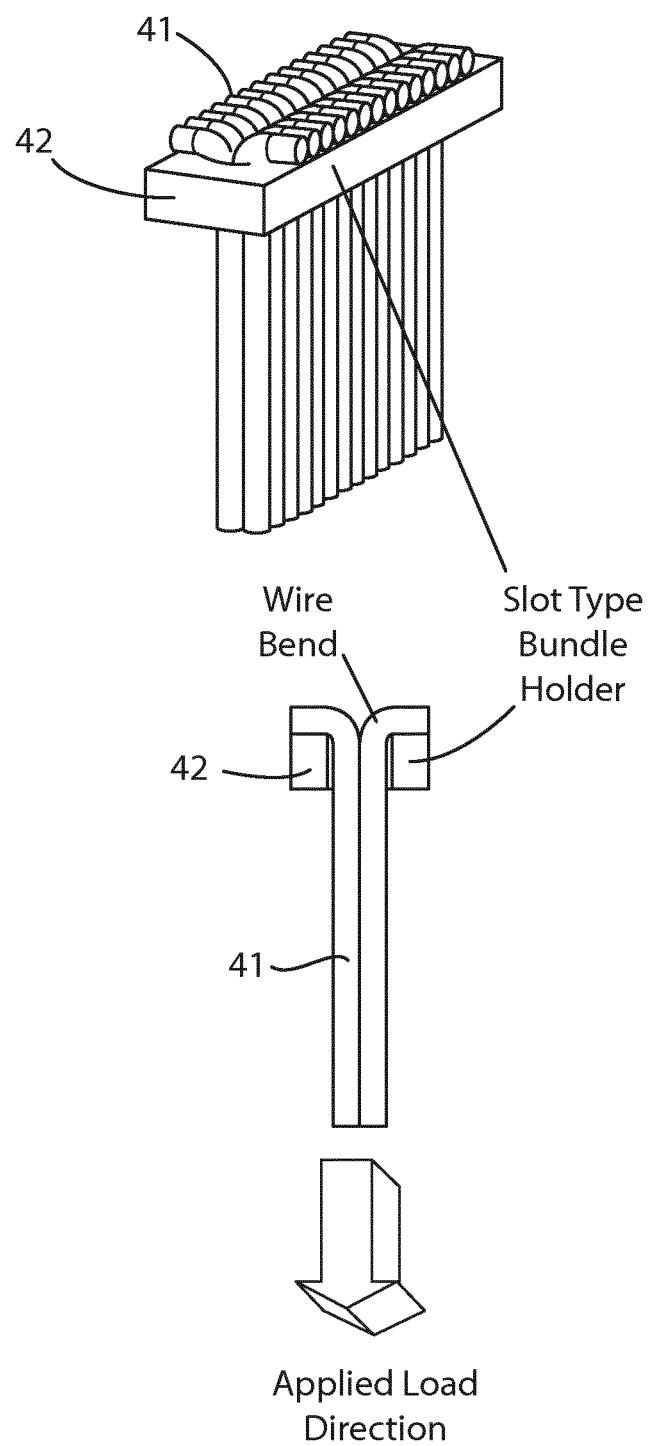
FIG. 5 illustrates a plurality of kinked or bent wires fed into a bundle holder, according to one embodiment of the invention.

Another embodiment of the invention is shown in FIG. 4, where a high level of heat is used to place a bend or kink on each end of the wire, indicated by the reference numeral 41. This acts as a stop when the wire 41 is loaded by resting against the surface of a wire bundle holder unit 42, as illustrated in FIG. 5. The wires can be lined up beside each other on a single plane, thus facilitating a tightly packed arrangement of wires.

Figure 6:
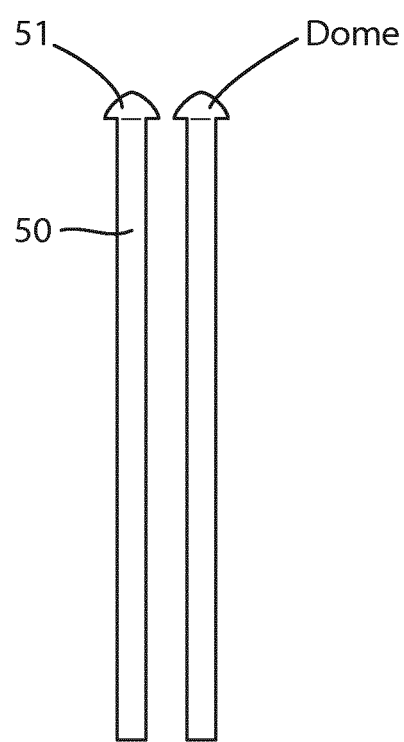
FIG. 6 illustrates views of a number of wires with domed shape ends making up the engine core, according to one aspect of the invention.
Figure 7:
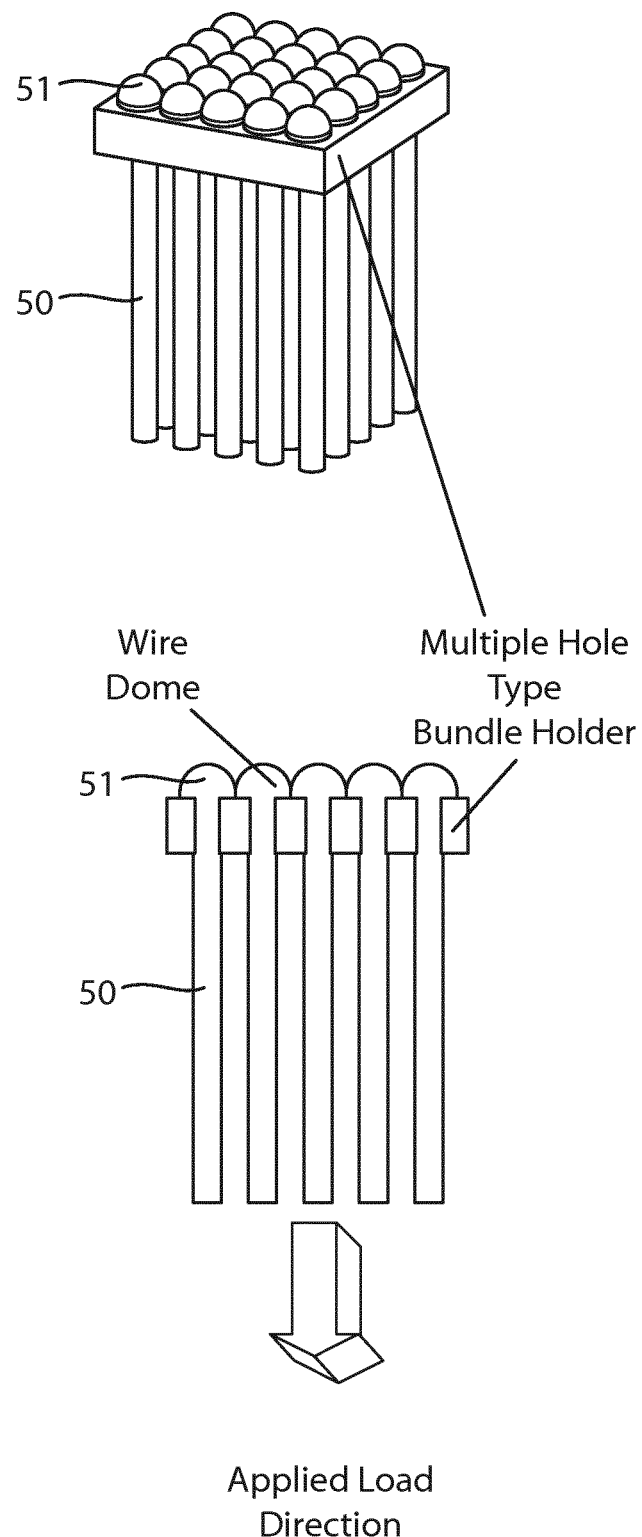
FIG. 7 illustrates a plurality of kinked or bent wires fed into a bundle holder, according to one embodiment of the invention.

FIG. 6 illustrates another embodiment where one end of the wire 50 is dome shaped 51 to act as a stop when the wire is being held in a bundle or wire holder. The domed ends of the wire are larger than the holes in which the wires are placed, thus when a load is applied, the domes 51 act to resist pull-through, as illustrated in FIG. 7. In this scenario, the assembly direction of the domes is irrelevant due to their cylindrical nature.

It will be appreciated that the energy recovery device can comprise a plurality of Shape Memory Alloy (SMAs) or Negative Thermal Expansion (NTE) elements arranged as a plurality of wires positioned substantially parallel with each other to define a core. The wires, for example, can be those described above with respect to FIGS. 2 to 7.

Cast Embodiment

In order to secure the plurality of NiTi wires in a reliable and durable fashion a system/device capable of anchoring them at both ends has to be developed. This system has to operate under high load. The bundle holder must overcome some specific problems:

1) Transmitting the high-force, low displacement load of the NiTi wires during operation. 2) Enabling the close-packing of the wires, insofar as possible, to enable maximum heat transfer from the transiting water to the wire and vice versa.

3) From a manufacturing point of view, the bundle holder has to eliminate the tedious and strenuous process of placing hundreds of these NiTi wires in some sort of support and reduce production time and costs.

For a high power output a large number of SMA wires are required. The manufacturing of bundles with a high number of holes in them is expensive and time-consuming and the consistent swaging of the wires is difficult to perform. In one embodiment a casting alternative to the machined bundle holder can be used. The wires will not need to be swaged as they will be imbedded in a mould. Casting is most often used for making complex shapes that would be otherwise difficult or uneconomical to make by other methods. Casting is a manufacturing process by which a liquid material is usually poured into a mould, which contains a hollow cavity of the desired shape, and then allowed to solidify.

Not all metals are appropriate to be used as bundle holder materials. Shape-Memory Alloys contract when heated, while most metals expand. A non-reactive material can be selected in this case. There are alloyed materials that have zero thermal expansion while heated. Some of the materials suited for the energy recovery device include, but are not limited to, the following:

Tetramethylammonium copper(I) zinc (II) cyanide has a zero or near zero thermal expansion between the temperatures of; 200K→400K (i.e. −73.15→126.85° C.)

(1−x)PbTi)O3−xBi(Mg, Ti)1/2O3 has zero or near zero thermal expansion between the temperatures of; room temp→500° C.

Silver Iodide+Copper Iodide

As the casting will be done at high temperatures the SMA will be at its smallest size (austenitic phase—the diameter of the wire decreases). This process will ensure the fixing of the wire, since the transition from austenite to martensite will result in an increase of diameter, so the cast will act as interference fit.

Wire Mesh

In order for a Nitinol core to actuate a piston, a method must be identified for fixing a bundle of wires so that one end is fixed to the top of the core and the other end is attached to the piston.

One issue that arises with bundle holders that require thousands of holes that are bored from one single block of material is that the process is quite time-consuming and creates a high amount of material waste.

Figure 8:
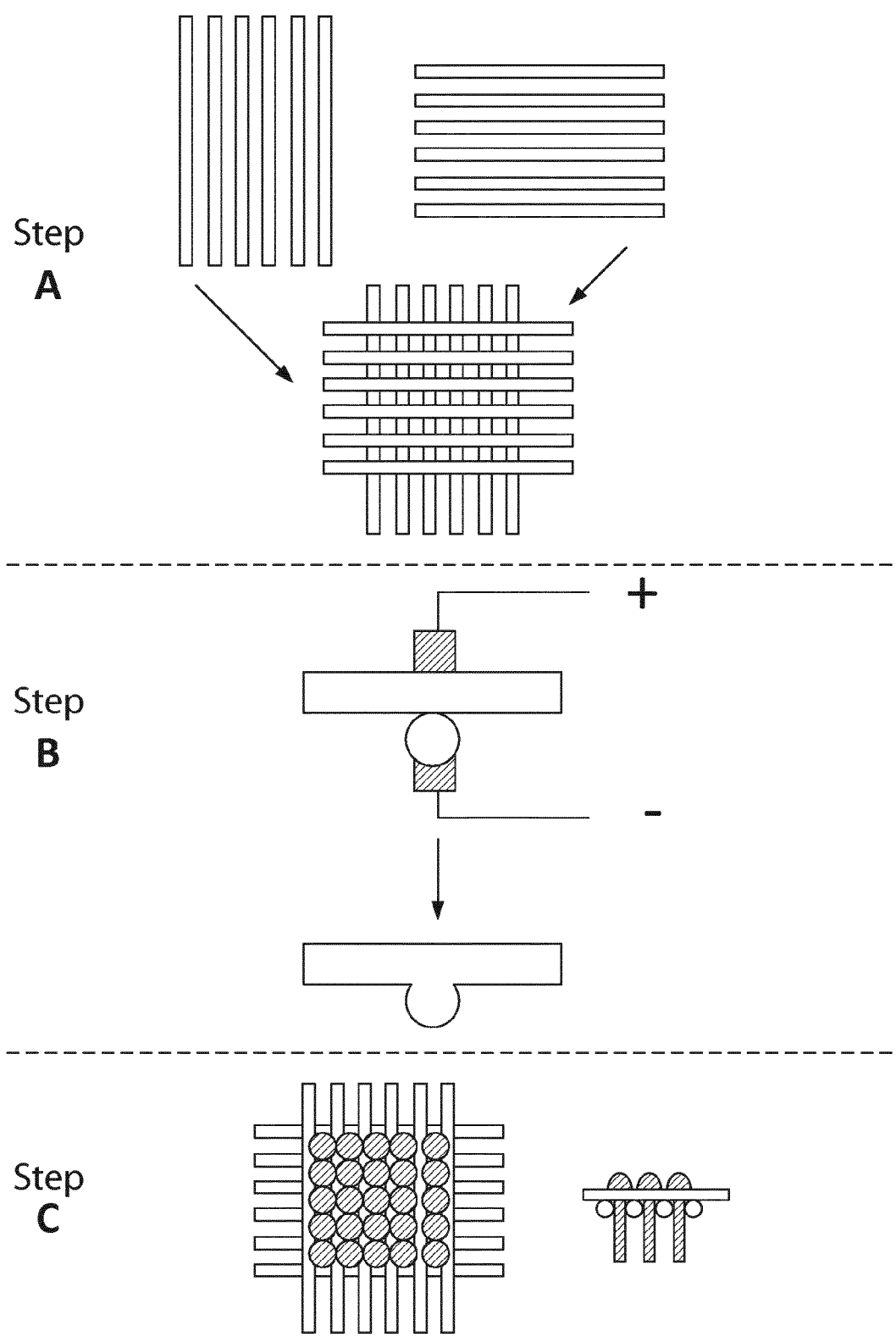
FIG. 8 illustrates a wire bundle holder according to another aspect of is the invention.

FIG. 8 shows a proposed way of manufacturing a bundle holder that contains thousands of holes. The concept replaces the need for machining solid blocks of material by creating a mesh using wire versions of the same material. As can be seen in step A, the wire would be cut into pre-defined lengths. It would then be placed into a jig which would maintain the distance between each wire. This would form a bottom layer. Another set of wires would then be placed on top of the first layer; however this layer would be rotated at a 90° angle to the first layer. From a top view this would have the same appearance as a bundle with several holes.

The next step would be to fuse the top and bottom layer. This would increase the rigidity of the bundle and prevent the gap between wires from increasing or decreasing. One way that layers could be fused together would be by using a spot welding technique commonly used to weld panels and thin metals.

This process consists of an Anode (−) and a Cathode (+). The anode is placed on the top layer while the cathode is positioned on the bottom layer. The anode and cathode press the two wires together at one junction. A current is then passed through the junction which causes it to heat, melt and fuse the wires together. This would be advantageous over drilling holes as a typical spot weld takes 0.63 seconds to fuse the wire. Naturally more time would need to be added to let the weld cool.

One drawback to the method is that the spot welding process would have to be done at every overlapping point. However multiple junctions can be welded by using a number of anodes and cathodes to do a row at a time. This would be a desirable feature as it would allow the entire process to be automated with minimum material waste.

Also the strength of the bundle holder can be increased by simply adding more layers. This would be particularly advantageous if a part of the bundle holder failed during service as it would allow the bundle holder to be repaired rather than recycled.

Pear Slots Embodiment

As outlined above the bundle holder must overcome some specific problems:

1) Transmitting the high-force, low displacement load of the NiTi wires during operation. 2) Enabling the close-packing of the wires, insofar as possible, to enable maximum heat transfer from the transiting water to the wire and vice versa.

3) From a manufacturing point of view, the bundle holder has to eliminate the tedious and strenuous process of placing hundreds of these NiTi wires in some sort of support and reduce production time and costs.

Having to slot large numbers of wires into drilled holes in a bundle holder is a very time-consuming operation and doming the wire while it is in the bundle holder makes the construction of the bundles slow and tedious.

Doming the wires at both ends after it has been cut means that no further work has to be done to the wire. These wires are then inserted into a bundle holder which has slots cut out. The width of these slots is equal to the diameter of the wire, which allows the dome at the top of the wire to rest on either side of the slot. The wire will be inserted into the bundle holder through a hole that is wider than each dome at the end of every row. This hole will then have a screw threaded into it to hold the wires in place and complete the bundle. This method also allows both the top and bottom layer of the bundle to be inserted at the same time.

It will be appreciated that while Shape Memory Alloys (SMAs) are herein discussed, NTE materials can be used for certain types of applications.

Examples of NTE materials but not limited in the context of the invention, are: Cubic Zirconium Tungstate (ZrW2O8), $AM_2O_8$ family of materials (where A=Zr or Hf, M=Mo or W) and $ZrV_2O_7$, Quartz and a number of zeolites, Cubic Scandium trifluoride.

Examples of Shape memory polymers but not limited in the context of the invention, are: polyurethanes, polyurethanes with ionic or mesogenic components made by pre-polymer method, block copolymer of polyethylene terephthalate (PET) and polyethyleneoxide (PEO), block copolymers containing polystyrene and poly(1,4-butadiene), and an ABA triblock copolymer made from poly(2-methyl-2-oxazoline) and polytetrahydrofuran, amorphous polynorbornene.

Examples of SMA materials, but not limited in the context of the invention, are: Ag—Cd 44/49 at. % Cd, Au—Cd 46.5/50 at. % Cd, Cu—Al—Ni 14/14.5 wt % Al and 3/4.5 wt % Ni, Cu—Sn approx. 15 at % Sn, Cu—Zn 38.5/41.5 wt. % Zn, Cu—Zn—X (X=Si, Al, Sn), Fe—Pt approx. 25 at. % Pt, Mn—Cu 5/35 at % Cu, Fe—Mn—Si, Co—Ni—Al, Co—Ni—Ga, Ni—Fe—Ga, Ti—Nb, Ni—Ti approx. 55-60 wt % Ni, Ni—Ti—Hf, Ni—Ti—Pd, Ni—Mn-G.

In the specification the terms "comprise, comprises, comprised and comprising" or any variation thereof and the terms include, includes, included and including" or any variation thereof are considered to be totally interchangeable and they should all be afforded the widest possible interpretation and vice versa.

The invention is not limited to the embodiments hereinbefore described but may be varied in both construction and detail.

The invention claimed is:

1. An energy recovery device comprising:
an engine comprising a plurality of Negative Thermal Expansion (NTE) elements fixed at a first end and connected at a second end to a drive mechanism characterised in that the plurality of Negative Thermal Expansion (NTE) elements are arranged as a plurality of wires positioned substantially parallel with each other to define a core and a holder is configured with a plurality of slots adapted to receive the plurality of NTE elements to hold the core securely in place within an immersion chamber to move the drive mechanism, during operation, through sequential filling of the immersion chamber with fluid to heat and cool the core.

2. An energy recovery device as claimed in claim 1 wherein the holder comprises a plate perforated with slots sized such that the elements can engage the slot and be secured in place.

3. An energy recovery device as claimed in claim 2 wherein at least one element comprises a swage terminal end for restricting movement of the element when engaged with the holder.

4. An energy recovery device as claimed in claim 2 wherein at least one element comprises a kinked or bent end for restricting movement of the element when engaged with the holder.

5. An energy recovery device as claimed in claim 2 wherein at least one element comprises a dome shaped end for restricting movement of the element when engaged with the holder.

6. An energy recovery device as claimed in claim 1 wherein the plurality of Negative Thermal Expansion (NTE) elements comprises one or more of a Shape Memory Alloy.

7. An energy recovery device as claimed in claim 6 wherein the Shape Memory Alloy comprises at least one of: a Nickel-Titanium alloy, a copper-zinc-aluminium-nickel alloy, or a copper-aluminium-nickel alloy.

8. A holder, for use in an energy recovery device or engine, comprising a plurality of slots configured to receive a plurality of Negative Thermal Expansion (NTE) elements to hold the plurality of NTE elements in place within an immersion chamber to move a drive mechanism, fixed to one end of the plurality of NTE elements, through sequential filling of the immersion chamber with fluid to heat and cool the plurality of NTE elements.

9. The holder of claim 8 wherein the holder comprises a plate perforated with slots sized such that the elements can engage the slot and be secured in place.

* * * * *